US010978719B2

(12) United States Patent
Zhang et al.

(10) Patent No.: US 10,978,719 B2
(45) Date of Patent: Apr. 13, 2021

(54) PLATINUM/BLACK PHOSPHORUS-CARBON SPHERE METHANOL FUEL CELL ANODE CATALYST AND PREPARATION METHOD THEREOF

(71) Applicant: QINGDAO UNIVERSITY, Shandong (CN)

(72) Inventors: Feifei Zhang, Qingdao (CN); Zonghua Wang, Qingdao (CN); Zhenyu Wang, Qingdao (CN); Xing Luo, Qingdao (CN); Xiaofang Duan, Qingdao (CN)

(73) Assignee: QINGDAO UNIVERSITY, Shandong (CN)

( * ) Notice: Subject to any disclaimer, the term of this patent is extended or adjusted under 35 U.S.C. 154(b) by 186 days.

(21) Appl. No.: 16/322,439

(22) PCT Filed: Dec. 8, 2017

(86) PCT No.: PCT/CN2017/115116
§ 371 (c)(1),
(2) Date: Jan. 31, 2019

(87) PCT Pub. No.: WO2019/056587
PCT Pub. Date: Mar. 28, 2019

(65) Prior Publication Data
US 2020/0112033 A1 Apr. 9, 2020

(30) Foreign Application Priority Data
Sep. 25, 2017 (CN) .......................... 201710872956.4

(51) Int. Cl.
H01M 4/92 (2006.01)
H01M 8/1011 (2016.01)

(52) U.S. Cl.
CPC ......... H01M 4/926 (2013.01); H01M 8/1011 (2013.01)

(58) Field of Classification Search
CPC .. H01M 4/926; H01M 8/1011; H01M 4/8882; H01M 4/88; H01M 4/8842; H01M 4/9083; H01M 4/925; B82Y 30/00
See application file for complete search history.

(56) References Cited

U.S. PATENT DOCUMENTS

2018/0346337 A1* 12/2018 Tour .................. C25B 11/12

FOREIGN PATENT DOCUMENTS

CN 101890368 A 11/2010
CN 103041823 A 4/2013
(Continued)

OTHER PUBLICATIONS

Jun. 27, 2018 International Search Report issued in International Patent Application No. PCT/CN2017/115116.
(Continued)

Primary Examiner — Stewart A Fraser
(74) Attorney, Agent, or Firm — Oliff PLC

(57) ABSTRACT

A platinum/black phosphorus-carbon sphere methanol fuel cell anode catalyst and preparation method thereof including the following steps: (1) dispersing a black phosphorus solid in an organic solvent to obtain a single or a few layers of black phosphorus dispersion with set concentration; (2) mixing the dispersion with glucose and stirring until dissolved; (3) performing a hydrothermal reaction on the solution to obtain an aqueous solution of the composite material containing a carbon core black phosphorus shell structure; (4) uniformly mixing the aqueous solution with an ethylene glycol solution of sodium chloroplatinate, adjusting the pH, then reducing the platinum on the surface by using a microwave irradiation heating method; and (5) filtering, washing and drying the obtained composite material to obtain a platinum/black phosphorus-carbon sphere composite material. The composite material is applied to a direct (Continued)

methanol fuel cell anode catalyst, the catalytic and stability performance of which are greatly improved.

9 Claims, 2 Drawing Sheets

(56) References Cited

FOREIGN PATENT DOCUMENTS

| | | |
|---|---|---|
| CN | 103456969 A | 12/2013 |
| CN | 104393312 A | 3/2015 |
| CN | 105056942 A | 11/2015 |
| CN | 105489904 A | 4/2016 |
| WO | 2008/025751 A1 | 3/2008 |

OTHER PUBLICATIONS

Jun. 27, 2018 Written Opinion issued in International Patent Application No. PCT/CN2017/115116.

* cited by examiner

PLATINUM/BLACK PHOSPHORUS-CARBON SPHERE METHANOL FUEL CELL ANODE CATALYST AND PREPARATION METHOD THEREOF

FIELD OF THE INVENTION

The present invention belongs to the field of composite catalyst preparation, and in particular to a platinum/black phosphorus-carbon sphere methanol fuel cell anode catalyst and a preparation method thereof.

BACKGROUND OF THE INVENTION

With the development of science and technology and the improvement of human living standards, the consumption of fossil fuels is increasing day by day, and the damage to the ecological environment is caused, therefore it is urgent to search for renewable alternative energy sources to relieve the environmental pressure. A direct methanol fuel cell provides a new idea for solving the environmental problem due to the high energy density, environmental friendliness, convenience for carrying and storage and the like. The direct methanol fuel cell has a broad application prospect in the fields of mobile power sources, portable electronic products and the like. However, the low activity, poor stability and other shortcomings of an anode catalyst hinder the large-scale commercial application. Therefore, there is an urgent need to find a high-performance direct methanol anode catalyst.

Black phosphorus, also known as phosphorene, has an orthogonal structure and is a phosphorus allotrope with the least reactivity of phosphorus. The layered black phosphorus is thermodynamically stable at the room temperature, and its phonons, photons and electrons exhibit high anisotropy, thereby having a great potential application value in electronic thin films and the infrared optoelectronic technology. The black phosphorus, serving as a semiconductor material, has high-performance carrier mobility (usually higher than 200 $cm^2$ $V^{-1}$ $s^{-1}$), so the phosphorene has a broad application prospect in the fields of field effect transistors, optoelectronic devices, spintronics, gas sensors and solar cells.

SUMMARY OF THE INVENTION

In view of the above prior art, the objective of the present invention is to provide a platinum/black phosphorus-carbon sphere methanol fuel cell anode catalyst and a preparation method thereof, the preparation process of the catalyst is simple, the raw materials are cheap and easily available, and the catalytic effect is remarkably improved.

To achieve the above objective, the present invention adopts the following technical solution:

In a first aspect of the present invention, a platinum/black phosphorus-carbon sphere composite material for preparing a methanol fuel cell anode catalyst is provided, wherein the composite material includes a black phosphorus-carbon sphere core-shell structure formed by coating the surface of a carbon sphere with the black phosphorus, the material of which is used as a catalyst substrate, and platinum nanoparticles are uniformly loaded on the surface of the substrate material.

In a second aspect of the present invention, an application of the platinum/black phosphorus-carbon sphere composite material in a direct methanol fuel cell anode catalyst is provided.

In a third aspect of the present invention, a preparation method of a platinum/black phosphorus-carbon sphere composite material is provided, including the following steps:

(1) dispersing a black phosphorus solid in an organic solvent to obtain a single layer or a few layers of black phosphorus dispersion with set concentration;

(2) mixing the black phosphorus dispersion in the step (1) with glucose, and stirring until the glucose is completely dissolved;

(3) performing a hydrothermal reaction on the mixed solution in the step (2) to obtain an aqueous solution of the composite material containing a carbon core black phosphorus shell structure after the completion of the reaction;

(4) uniformly mixing the aqueous solution of the composite material containing the carbon core black phosphorus shell structure in the step (3) with an ethylene glycol solution of sodium chloroplatinate, adjusting the pH to alkaline, and then reducing the platinum on the surface of the composite material containing the carbon core black phosphorus shell by using a microwave irradiation heating method; and (5) filtering, washing and drying the composite material obtained in the step (4) to obtain a final product platinum/black phosphorus-carbon sphere composite material.

Compared with the prior art, the technical solution of the present invention has the following beneficial effects:

(1) in the platinum/black phosphorus-carbon sphere composite material for preparing the methanol fuel cell anode catalyst of the present invention, the core-shell structure formed by the black phosphorus and the carbon sphere can accelerate the electron transfer rate in a methanol oxidation process in a catalytic methanol oxidation process so as to improve the electrocatalytic performance. A single layer or a few layers of black phosphorus structure increase the specific surface area of loading the platinum nanoparticles. At the same time, the special flaky structure of the black phosphorus material provides a special loading site, the sizes of the platinum nanoparticles grown on the surface of the black phosphorus by using the microwave irradiation heating method are 3.8-4.5 nm, the sizes are uniform, and the distribution is uniform, thereby greatly promoting the exposure of electrochemically active surface areas of the platinum nanoparticles and increasing the active sites of catalyzing the methanol oxidation.

(2) The platinum/black phosphorus-carbon sphere composite material prepared by the present invention is applied to the direct methanol fuel cell anode catalyst, the catalytic performance and stability performance thereof are greatly improved, meanwhile, the composite substrate black phosphorus-carbon sphere can withstand the environments of strong acid and strong alkali and can catalyze the methanol oxidation reaction in both acidic and alkaline environments, therefore, the composite material and method of the present invention provide a new idea for solving the commercial production of methanol fuel cells.

(3) Compared with the existing methanol fuel cell catalyst, the present invention has the advantages that the preparation process is simple, the raw materials are cheap and easily available, and the catalyst cost is greatly reduced, thereby being suitable for large-scale commercial production.

BRIEF DESCRIPTION OF THE DRAWINGS

The drawings of the specification constituting a part of the present invention are used for providing a further understanding of the present invention. The illustrative embodiments of the present invention and the explanations thereof are used for explaining the present invention, and do not constitute undue limitation of the present invention.

DETAILED DESCRIPTION OF THE EMBODIMENTS

Figure 1:
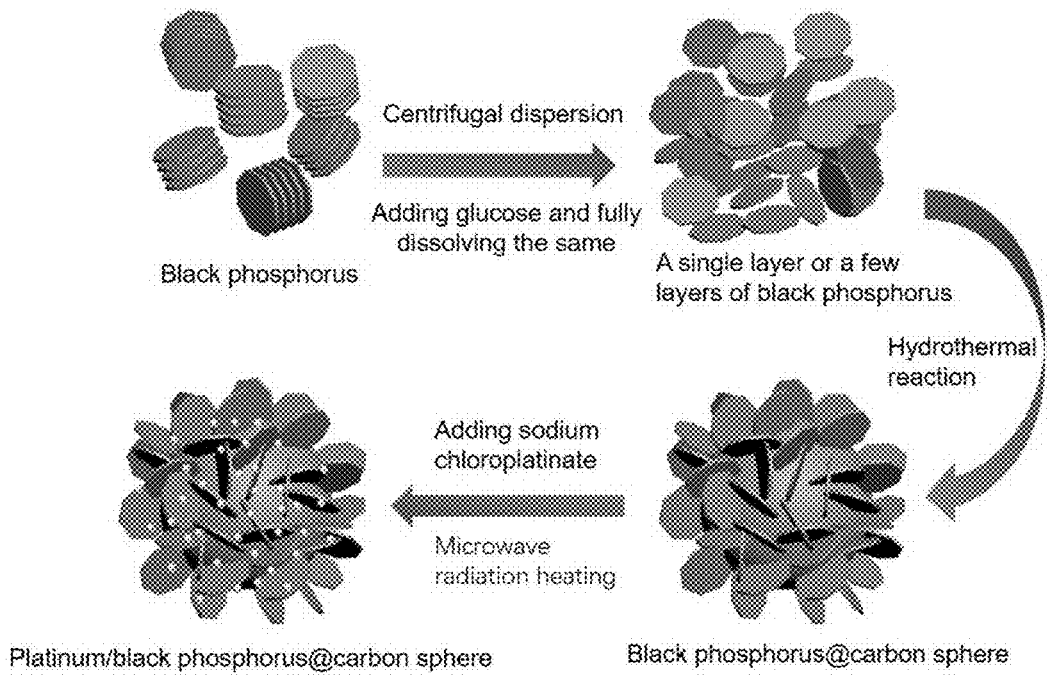
FIG. 1 is a schematic diagram of a preparation process of a platinum/black phosphorus-carbon sphere methanol fuel cell anode catalyst.

It should be noted that the following detailed description is exemplary and is intended to provide a further description of the present invention. Unless otherwise indicated, all technical and scientific terms used herein have the same meanings as commonly understood by those of ordinary skill in the art to which the present invention belongs.

It should be noted that the terms used herein are merely for the purpose of describing specific embodiments, and are not intended to limit the exemplary embodiments of the present invention. As used herein, singular forms are also intended to include plural forms, unless the context clearly indicates otherwise, in addition, it should also be understood that when the terms "contain" and/or "include" are used in the specification, they indicate the existence of features, steps, operations, and/or combinations thereof.

As described in the background art, the direct methanol anode catalyst in the prior art has certain shortcomings. In order to solve the above technical problems, the present invention proposes a platinum/black phosphorus-carbon sphere composite material for preparing a methanol fuel cell anode catalyst, wherein the composite material includes a carbon sphere, with a single layer or few layers of flaky black phosphorus loaded on the surface of the carbon sphere, and with platinum nanoparticles loaded on the black phosphorus. The few layers are 2-10 layers.

In a preferred embodiment of the present invention, the size of each structure of the composite material is further defined: the particle diameter of the carbon sphere is 1-2 μm, the size of the flaky black phosphorus is 200-400 nm (the numerical value refers to the size of the black phosphorus in the length direction), and the size of the platinum nanoparticle is 3.8-4.5 nm.

In a preferred embodiment of the present invention, a preparation method of a platinum/black phosphorus-carbon sphere composite material is provided, in which the preparation process is simple, the raw materials are cheap and easily available, and the catalytic effect is remarkably improved, and the method includes the following steps:

(1) dispersing a nubbly black phosphorus solid in an organic solvent to obtain a single layer or few layers of black phosphorus dispersion with set concentration;

(2) mixing the black phosphorus dispersion in the step (1) with glucose, and stirring until the glucose is completely dissolved;

(3) performing a hydrothermal reaction on the mixed solution in the step (2) to obtain an aqueous solution of the composite material containing a carbon core black phosphorus shell structure after the completion of the reaction;

(4) uniformly mixing the aqueous solution of the composite material containing the carbon core black phosphorus shell structure in the step (3) with an ethylene glycol solution of sodium chloroplatinate, adjusting the pH to alkaline, and then reducing the platinum on the surface of the composite material containing the carbon core black phosphorus shell by using a microwave irradiation heating method; and (5) filtering, washing and drying the composite material obtained in the step (4) to obtain a final product platinum/black phosphorus-carbon sphere composite material.

Further, in order to make the platinum/black phosphorus-carbon sphere composite material have more excellent stability performance and catalytic performance, the present invention screens and optimizes the process conditions of each step in the preparation method as follows:

In the step (1), by using a method of centrifuging the dispersion at a rotating speed from low to high, a single layer or few layers of flaky black phosphorus dispersion can be effectively obtained, and the specific surface area of loading the platinum nanoparticles is increased.

Preferably, the rotating speed for centrifugal dispersion of the black phosphorus dispersion ranges from low to high from 500-2000 rpm according to the needs of the number of layers, centrifugation is performed for 5 to 7 times, each centrifugation time is 5-15 minutes.

Preferably, the concentration of the black phosphorus dispersion is 2.0-5.0 mg/mL.

Preferably, the organic solvent is N-methyl-2-pyrrolidone (NMP).

In the step (2), preferably, the ratio of the black phosphorus dispersion to the glucose is (20-80) mL:(25-100) mg.

In the step (3), preferably, the stirring speed in the hydrothermal reaction is 400-800 rpm, the reaction temperature is 120-200° C., and the reaction time is 12-24 hours. Under these conditions, the carbon sphere with the required particle diameter of the present invention can be obtained.

In the step (4), preferably, the concentration of the ethylene glycol solution of the sodium chloroplatinate is 2.0 mol/L, and the volume ratio of the ethylene glycol solution of the sodium chloroplatinate to the aqueous solution of the composite material containing the carbon core black phosphorus shell structure is 1:(1-8).

Preferably, the pH of the ethylene glycol solution of sodium chloroplatinate is adjusted to 8-12 by using NaOH.

In order to obtain a specific particle size and more uniform platinum nanoparticles, so that the obtained composite material has excellent catalytic performance, the present invention selects the microwave radiation heating method to reduce the catalyst platinum on the surface of the composite substrate black phosphorus-carbon sphere; and preferably, the microwave radiation heating temperature is 800-1000° C.

In the step (5), preferably, sufficient washing is performed by using ethanol and deionized water. Preferably, the drying temperature is 60-80° C., and the drying time is 4-6 hours.

In order that those skilled in the art can understand the technical solution of the present invention more clearly, the technical solution of the present invention will be described in detail below with reference to specific embodiments.

Embodiment 1

A schematic diagram of a preparation method of a platinum/black phosphorus-carbon sphere methanol fuel cell anode catalyst is shown in FIG. 1. The detailed preparation steps are as follows:

A nubbly black phosphorus solid with a certain mass is dispersed in an N-methyl-2-pyrrolidone (NMP) solution to obtain 2.0 mg/mL black phosphorus dispersion. Centrifugation is performed for 10 min at 500 rpm, 1000 rpm and 1500 rpm, respectively, and the supernatant is retained each time. 25 mg of glucose powder is added to 80 mL of the supernatant obtained by the last centrifugation, and the supernatant is stirred until the glucose powder is completely dissolved. The mixed solution is transferred to a polytetrafluoroethylene reaction kettle, a reaction is performed at a rotating speed of 150 rpm for 16 hours at 150° C. to obtain a composite catalyst substrate material of a carbon core black phosphorus shell structure (black phosphorus-carbon sphere). 20 mL of the aqueous solution of the obtained black phosphorus-carbon sphere composite material is extracted, 40 mL of 2.0 mol/L ethylene glycol solution of sodium chloroplatinate is added, and the pH is adjusted to 10 by using NaOH. Finally, the catalyst platinum is reduced on the surface of the composite substrate black phosphorus-carbon sphere via microwave radiation heating at 800° C. The heated sample is filtered and washed sufficiently with ethanol and deionized water, and the obtained sample is dried at 65° C. for 5 hours to obtain the final product platinum/black phosphorus-carbon sphere composite material.

Figure 2:
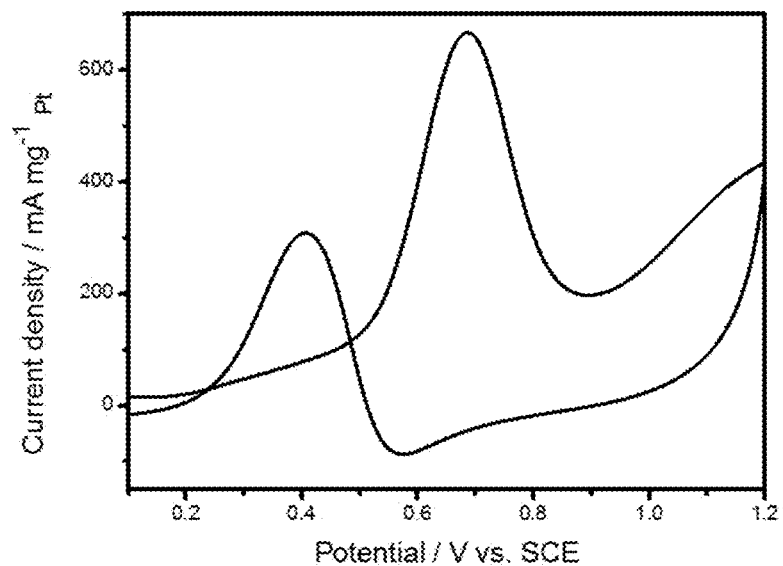
FIG. 2 is a cyclic voltammetry curve of a platinum/black phosphorus-carbon sphere composite catalyst in a mixed solution of 0.5 mol/L methanol and 1.0 mol/L sulphuric acid.

The prepared platinum/black phosphorus-carbon sphere composite catalyst is prepared into a 2 mg/mL solution, the solution is dripped on the surface of a bare glass carbon electrode, in 1.0 M $CH_3OH$+0.5 M $H_2SO_4$, scanning is performed by using the cyclic voltammetry, and as shown in FIG. 2, it can be seen that the platinum/black phosphorus-carbon sphere composite catalyst obtained by the method involved in the present invention has good catalytic performance on methanol under acidic conditions.

Embodiment 2

A preparation method of a platinum/black phosphorus-carbon sphere methanol fuel cell anode catalyst is as follows: a nubbly black phosphorus solid with a certain mass is dispersed in an N-methyl-2-pyrrolidone (NMP) solution to obtain 3.0 mg/mL black phosphorus dispersion. Centrifugation is performed for 8 min at 1000 rpm, 1500 rpm and 2000 rpm, respectively, and the supernatant is retained each time. 30 mg of glucose powder is added to 50 mL of the supernatant obtained by the last centrifugation, and the supernatant is stirred until the glucose powder is completely dissolved. The mixed solution is transferred to a polytetrafluoroethylene reaction kettle, a reaction is performed at a rotating speed of 700 rpm for 12 hours at 180° C. to obtain a composite catalyst substrate material of a carbon core black phosphorus shell structure (black phosphorus-carbon sphere). 10 mL of the aqueous solution of the obtained black phosphorus-carbon sphere composite material is extracted, 20 mL of 2.0 mol/L ethylene glycol solution of sodium chloroplatinate is added, and the pH is adjusted to 10 by using NaOH. Finally, the catalyst platinum is reduced on the surface of the composite substrate black phosphorus-carbon sphere via microwave radiation heating at 900° C. The heated sample is filtered and washed sufficiently with ethanol and deionized water, and the obtained sample is dried at 70° C. for 4 hours to obtain the final product platinum/black phosphorus-carbon sphere composite material.

Figure 3:
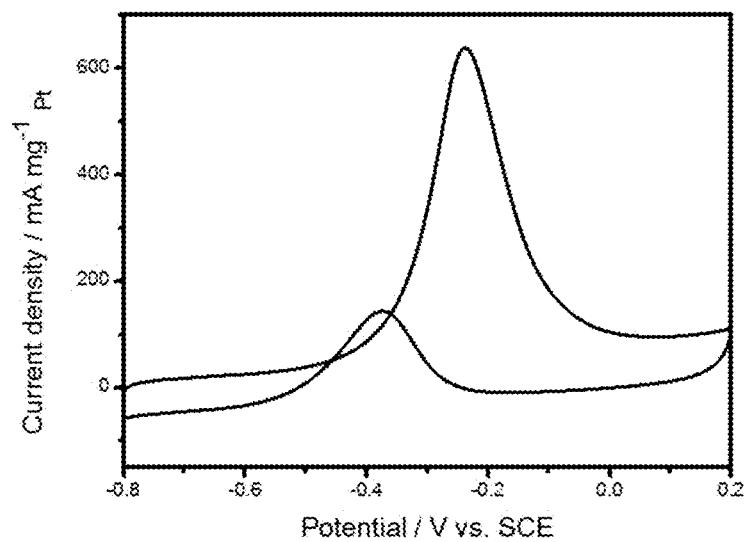
FIG. 3 is a cyclic voltammetry curve of a platinum/black phosphorus-carbon sphere composite catalyst in a mixed solution of 0.5 mol/L methanol and 1.0 mol/L sodium hydroxide.

The prepared platinum/black phosphorus-carbon sphere composite catalyst is prepared into a 2 mg/mL solution, the solution is dripped on the surface of a bare glass carbon electrode, in 1.0 M $CH_3OH$+0.5 M NaOH, scanning is performed by using the cyclic voltammetry, and as shown in FIG. 3, it can be seen that the platinum/black phosphorus-carbon sphere composite catalyst obtained by the method involved in the present invention also has good catalytic performance on methanol under alkaline conditions.

Embodiment 3

A preparation method of a platinum/black phosphorus-carbon sphere methanol fuel cell anode catalyst is as follows: a nubbly black phosphorus solid with a certain mass is dispersed in an N-methyl-2-pyrrolidone (NMP) solution to obtain 5.0 mg/mL black phosphorus dispersion. Centrifugation is performed for 5 min at 500 rpm, 1000 rpm and 2000 rpm, respectively, and the supernatant is retained each time. 25 mg of glucose powder is added to 30 mL of the supernatant obtained by the last centrifugation, and the supernatant is stirred until the glucose powder is completely dissolved. The mixed solution is transferred to a polytetrafluoroethylene reaction kettle, a reaction is performed at a rotating speed of 800 rpm for 20 hours at 120° C. to obtain a composite catalyst substrate material of a carbon core black phosphorus shell structure (black phosphorus-carbon sphere). 5 mL of the aqueous solution of the obtained black phosphorus-carbon sphere composite material is extracted, 30 mL of 2.0 mol/L ethylene glycol solution of sodium chloroplatinate is added, and the pH is adjusted to 11 by using NaOH. Finally, the catalyst platinum is reduced on the surface of the composite substrate black phosphorus-carbon sphere via microwave radiation heating at 1000° C. The heated sample is filtered and washed sufficiently with ethanol and deionized water, and the obtained sample is dried at 60° C. for 4 hours to obtain the final product platinum/black phosphorus-carbon sphere composite material.

Although the specific embodiments of the present invention have been described above in combination with the drawing, the protection scope of the present invention is not limited. Those skilled in the art to which the present invention belongs should understand that, on the basis of the technical solutions of the present invention, various modifications made by those skilled in the art without creative effort or slight modifications made on the basis of the present invention, shall still fall within the protection scope of the present invention.

The invention claimed is:

1. A platinum/black phosphorus-carbon sphere composite material for preparing a methanol fuel cell anode catalyst, wherein the composite material comprises a carbon sphere, a single layer or a few layers of black phosphorus is uniformly loaded on the surface of the carbon sphere, and platinum nanoparticles are uniformly loaded on the black phosphorus.

2. A preparation method of the platinum/black phosphorus-carbon sphere composite material according to claim 1, comprising the following steps:
   (1) dispersing a black phosphorus solid in an organic solvent to obtain a single layer or a few layers of black phosphorus dispersion with set concentration;
   (2) mixing the black phosphorus dispersion in the step (1) with glucose, and stirring until the glucose is completely dissolved;
   (3) performing a hydrothermal reaction on the mixed solution in the step (2) to obtain an aqueous solution of the composite material containing a carbon core black phosphorus shell structure after the completion of the reaction;
   (4) uniformly mixing the aqueous solution of the composite material containing the carbon core black phosphorus shell structure in the step (3) with an ethylene glycol solution of sodium chloroplatinate, adjusting the pH to alkaline, and then reducing the platinum on the surface of the composite material containing the carbon core black phosphorus shell by using a microwave irradiation heating method; and (5) filtering, washing and drying the composite material obtained in the step (4) to obtain a final product platinum/black phosphorus-carbon sphere composite material.

3. The preparation method according to claim 2, wherein in the step (1), the concentration of the black phosphorus dispersion is 2.0-5.0 mg/mL; and the rotating speed for centrifugal dispersion of the black phosphorus dispersion ranges from low to high from 500-2000 rpm according to the needs of the number of layers, centrifugation is performed for 5 to 7 times, each centrifugation time is 5-15 minutes.

4. The preparation method according to claim 2, wherein in the step (1), the organic solvent is N-methyl-2-pyrrolidone.

5. The preparation method according to claim 2, wherein in the step (2), the ratio of the black phosphorus dispersion to the glucose is (20-80) mL:(25-100) mg.

6. The preparation method according to claim 2, wherein in the step (3), the stirring speed in the hydrothermal reaction is 400-800 rpm, the reaction temperature is 120-200° C., and the reaction time is 12-24 hours.

7. The preparation method according to claim 2, wherein in the step (4), the concentration of the ethylene glycol solution of the sodium chloroplatinate is 2.0 mol/L, and the volume ratio of the ethylene glycol solution of the sodium chloroplatinate to the aqueous solution of the composite material containing the carbon core black phosphorus shell structure is 1:(1-8); and the pH of the ethylene glycol solution of sodium chloroplatinate is adjusted to 8-12 by using NaOH.

8. The preparation method according to claim 2, wherein in the step (4), the microwave radiation heating temperature is 800-1000° C.

9. The preparation method according to claim 2, wherein in the step (5), the drying temperature is 60-80° C., and the drying time is 4-6 hours; and sufficient washing is performed by using ethanol and deionized water.

* * * * *